(12) United States Patent
Lakkis et al.

(10) Patent No.: US 11,467,653 B2
(45) Date of Patent: *Oct. 11, 2022

(54) SYSTEMS AND METHODS FOR POWER MANAGEMENT IN LOW POWER COMMUNICATION DEVICE AND SYSTEM

(71) Applicant: ubilite, Inc., Carlsbad, CA (US)

(72) Inventors: Ismail Lakkis, Carlsbad, CA (US); Lai Xu, San Diego, CA (US)

(73) Assignee: UBILITE, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/003,899

(22) Filed: Aug. 26, 2020

(65) Prior Publication Data

US 2020/0393894 A1    Dec. 17, 2020

Related U.S. Application Data

(63) Continuation of application No. 15/444,157, filed on Feb. 27, 2017, now Pat. No. 10,817,045.

(51) Int. Cl.
   *G06F 1/3287* (2019.01)
   *G06F 1/3206* (2019.01)
   *G06F 1/3237* (2019.01)

(52) U.S. Cl.
   CPC .......... *G06F 1/3287* (2013.01); *G06F 1/3206* (2013.01); *G06F 1/3237* (2013.01)

(58) Field of Classification Search
   CPC .... Y02D 50/20; Y02D 10/171; Y02D 10/122; Y02D 10/44; G06F 1/3203; G06F 1/3287;
   (Continued)

(56) References Cited

U.S. PATENT DOCUMENTS 6,061,575 A    5/2000 Lombardi
6,448,672 B1   9/2002 Voegeli et al.
(Continued)

*Primary Examiner* — Jaweed A Abbaszadeh
*Assistant Examiner* — Brian J Corcoran
(74) *Attorney, Agent, or Firm* — Procopio, Cory, Hargreaves & Savitch LLP

(57) ABSTRACT

A radio module, comprises a battery; and a radio circuit, the radio circuit comprising: a DC-to-DC converter coupled with the batters and configured to convert a battery voltage to a first DC voltage level; at least one regulator coupled with the DC-to-DC converter and configured to covert the first DC voltage level to a second DC voltage level; at least one circuit block coupled with the at least one regulator such that the second DC voltage level is configured to provide power to the at least one circuit block; a real time clock configured to provide a clock signal to the at least one circuit block; and a management unit coupled with the at least one circuit block and configured to implement a state machine to control the at least one circuit block, wherein the state machine causes the management unit to cause the second DC voltage level to be removed from the at least one circuit during a first state comprising the state machine and, during a second state comprising the state machine, cause the second DC voltage level to be provided to the at least one circuit block, cause certain components within the circuit block to be reset, and provide a start signal to the circuit block enabling the circuit block to perform a function, and wherein the circuit block is configured to generate a signal indicating the function has been completed that is provided to the management unit, which causes the state machine to transition to a third state in which the second DC voltage is gain removed from the at least one circuit block.

17 Claims, 10 Drawing Sheets

(58) Field of Classification Search
CPC .... G06F 1/3206; G06F 1/3234; G06F 1/3293; G06F 9/4418; G06F 1/14; G06F 1/321
See application file for complete search history.

(56) References Cited

U.S. PATENT DOCUMENTS

| | | |
|---|---|---|
| 7,114,090 B2 | 9/2006 | Kardach et al. |
| 8,448,001 B1 | 5/2013 | Zhu et al. |
| 2004/0199796 A1 | 10/2004 | Boros |
| 2005/0215274 A1 | 9/2005 | Matson et al. |
| 2005/0239518 A1 | 10/2005 | D'Agostino et al. |
| 2006/0240798 A1 | 10/2006 | Jarosinski et al. |
| 2008/0168285 A1 | 7/2008 | de Cesare et al. |
| 2008/0248840 A1 | 10/2008 | Kim |
| 2009/0119527 A1 | 5/2009 | Kim |
| 2009/0204837 A1 | 8/2009 | Raval et al. |
| 2009/0292934 A1 | 11/2009 | Esliger |
| 2011/0260783 A1 | 10/2011 | Kawasaki |
| 2012/0030482 A1 | 2/2012 | Russell et al. |
| 2012/0144220 A1 | 6/2012 | Mearns |
| 2014/0281624 A1 | 9/2014 | Cahill-O'Brien et al. |
| 2014/0344599 A1 | 11/2014 | Branover et al. |
| 2015/0362987 A1 | 12/2015 | Shin et al. |
| 2016/0212389 A1 | 7/2016 | Mehrotra et al. |
| 2016/0246362 A1 | 8/2016 | Sugumar et al. |
| 2016/0282929 A1 | 9/2016 | Dutta et al. |

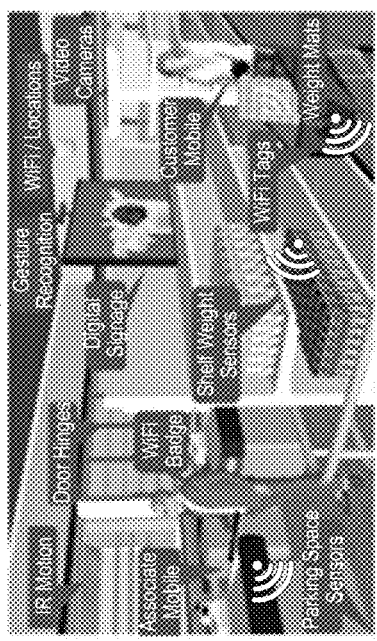
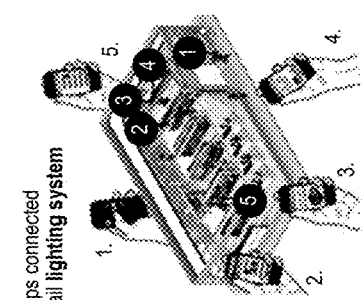
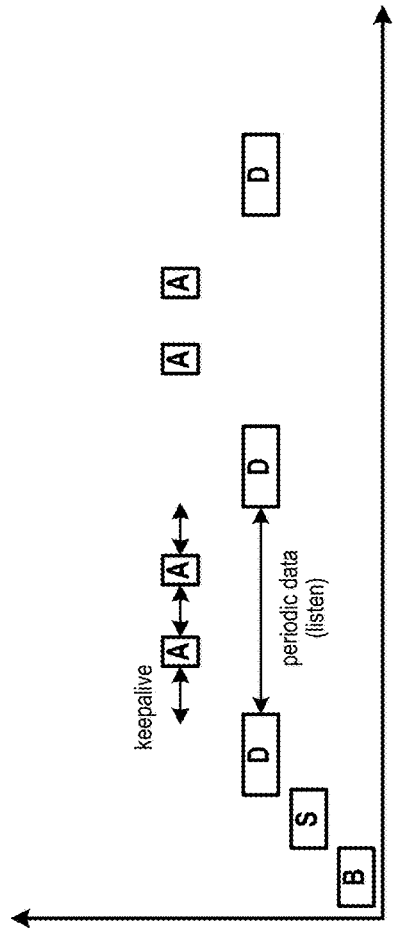

Active-Sleep Use-Case

Philips connected Retail lighting system
cisco smart shopping
philips smart lighting
fitbit purepulse
wifi pedometer ⓤ UBiLiTE

- Characteristics
  - Un-predictable traffic
  - Low power sleep state but fast response
  - Examples
    - Heartbeat monitor (periodic data collection and reporting)
    - Pedometer (busrty data collection and periodic reporting)
    - Intelligent shopping (only active when customer is present)
  - Data can come from the RF or sensor side
- Block activity
  - CPU, RF and detection circuit can stay awake
  - Periodic 'keepalive' packets can be exchanged for fast recovery
- Time scale
  - Unpredictable

FIG. 6

Deep-Sleep Use-Case (TX)

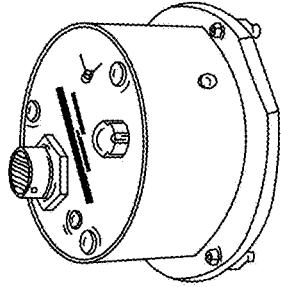

Earthquake det. sensor

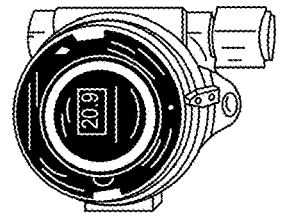

Oxygen def. sensor

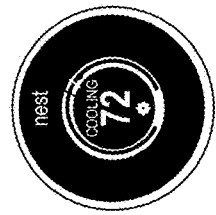

Nest thermostat

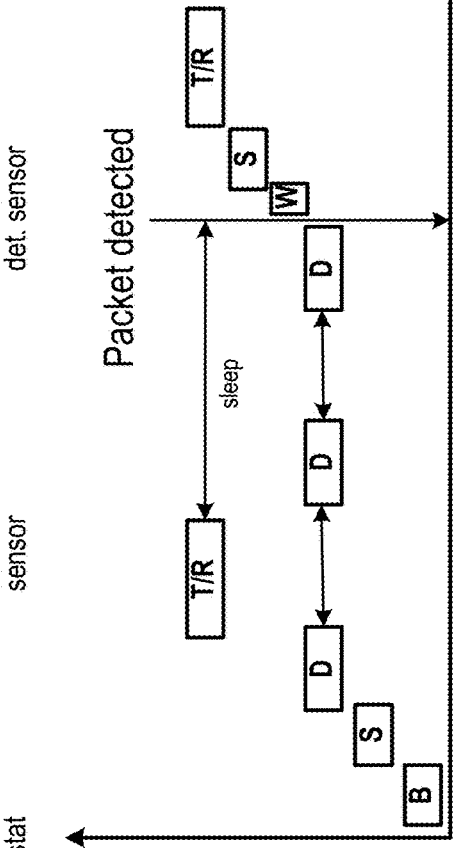

  UBILITE

- Characteristics
  - Most popular mode of sensors
  - Sensor event triggered
  - Examples
    - Nest thermostat (temperature sensor based trigger)
    - Toxic gas sensor (chemical sensor based trigger)
    - Earthquake detection (accelerometer based trigger)
- Block activity
  - Only CPU needs to be on for running the sensor logic
- Time scale
  - Temperature – multiple times a day
  - Toxic gas sensor – once every 10 years
  - Earthquake – once every year

FIG. 7

Listen Use-Case (RX)

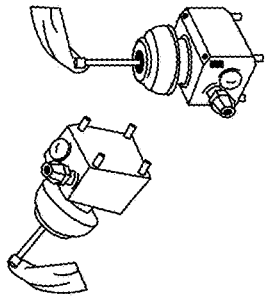
silo level sensor

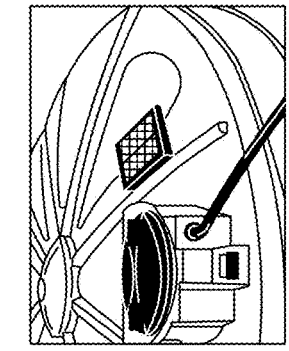
water level sensor

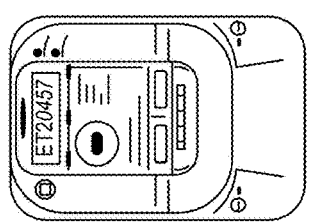
OSGP based meter

UBILITE

- Characteristics
  - On-air event based trigger
  - Data collection happens using a on-air command periodically
  - Examples
    - Smart power meters (data collection over wifi)
    - Agricultural tank level meters (centralized data collection)
    - Silo stock level meters (periodic drone monitoring)
- Block activity
  - Everything except the RF and detection circuit can sleep
- Time scale
  - Once a day or once a month active

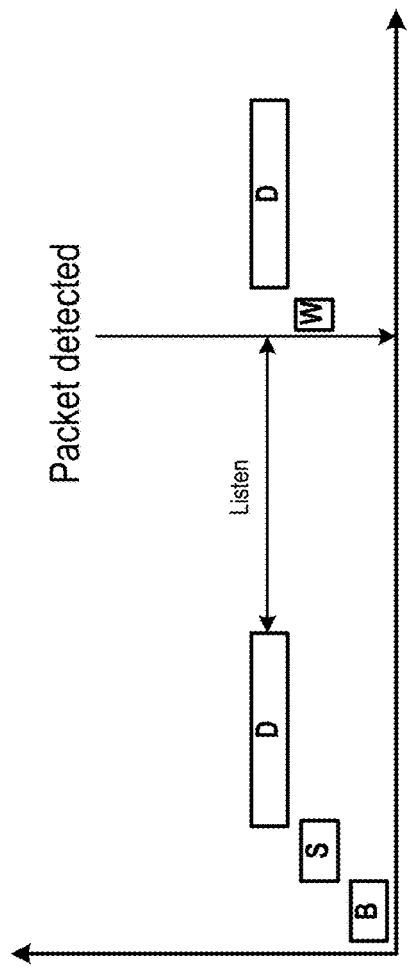

FIG. 8

Hibernate Use-Case (Ext. Trigger)

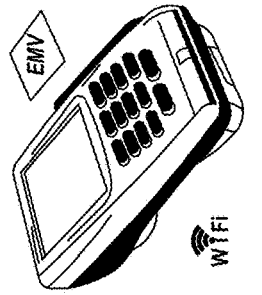

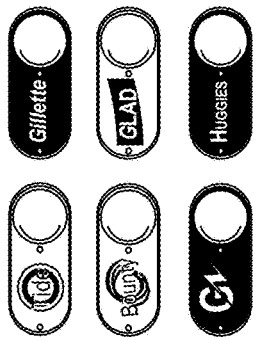

Amazon dash

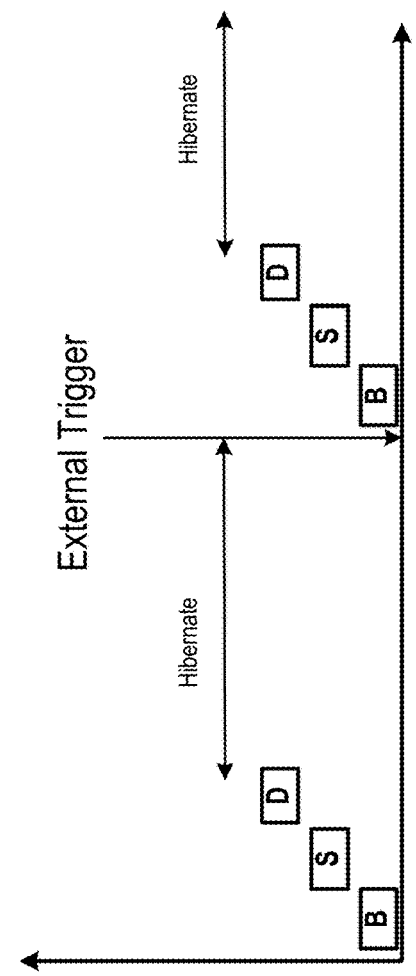

External Trigger

- Characteristics
  - External device based trigger
  - Type of external trigger varies
  - Examples
    - Amazon dash (occasional button trigger)
    - Inventory tagging (periodic trigger)
    - Wireless payment (custom protocol)
  - Delayed wakeup allowed
- Block activity
  - Cold boot allowed at startup
- Time scale
  - Once every 10 min activity

FIG. 9

SYSTEMS AND METHODS FOR POWER MANAGEMENT IN LOW POWER COMMUNICATION DEVICE AND SYSTEM

CROSS-REFERENCE TO RELATED APPLICATIONS

This application claims priority to U.S. patent application Ser. No. 15/444,157, filed Feb. 27, 2017, entitled "SYSTEMS AND METHODS FOR POWER MANAGEMENT IN LOW POWER COMMUNICATION DEVICE AND SYSTEM," the contents of which are incorporated herein by reference.

BACKGROUND

1. Technical Field

The embodiments described herein are related to wireless communication, and in particular to low cost, low power system-on-chip (SoC) circuit implementations.

2. Related Art

All wireless communications systems use a radio to transmit and receive wireless communication signals. Radio design for wireless communication systems is well established and most such systems use similar architectures for the transmit and receive circuits; however, as wireless communication capabilities are being embedded into ever more and ever smaller devices, conventional radio circuit designs struggle to provide the low cost and low power capabilities that such devices require.

FIG. 4 is a diagram illustrating a block diagram of a conventional wireless communication circuit 100. As can be seen circuit 100 comprises a digital section 102 and a radio section 104. The radio 104 is interfaced with an antenna 106, although it will be understood that certain designs can use or require multiple antennas. The circuit 100 comprises a transmit path ($t_x$) and a receive path ($r_x$). For the transmit path, data signals to be communicated are generated in the digital section 102, which can be a stand-alone circuit or part of a larger digital circuit, and sent to the radio 104. The data signals are then transformed by radio 104 into signals that can be transmitted via antenna 106.

Conversely, in the receive path, signals received by antenna 106 are transformed by radio 104 into digital signals that can be processed by digital circuit 102.

As wireless circuits are incorporated into ever more, and ever smaller devices, it is important to shrink the size, or footprint of the wireless circuit. Moreover, these devices often have to run for a long time and therefore require extreme low power. To address the size restrictions, the digital circuits 102 and radio front end components 104 are often implemented as part of a system on a chip (SoC). This is illustrated in FIG. 1, which shows a SoC 100 interfaced with an antenna 106. SoC 100 can also be interfaced with a sensor 120 and a battery 130. It will be understood that SoC 100, antenna 106, sensor 120, and battery 130 can be integrated into a single device or module, or some or all of the components can be external to the device or module, comprising SoC 100, depending on the implementation. Moreover, it will be understood that sensor 120 is in effect an event trigger device. In other words, the sensor senses something, or the lack thereof, and sends a signal to SoC 100, which causes SoC 100 to do something. It may just log the event, or it may transmit information related to the event. As such, sensor 120 can be replaced by, or included with some other form of event trigger such as a switch. But often with such implementations as described herein, the event trigger occurs infrequently, the need to report information related to the event triggers is infrequent, or both. Accordingly, a device incorporating SoC 100 often has very sporadic or intermittent need to transmit or really to do anything. But they also need to last, or cause the battery to last for the lifetime or near lifetime of the device into which they are installed.

For example, if the components of FIG. 1 are integrated into a refrigerator, or a thermostat, they often need to last for the lifetime of the refrigerator or thermostat, or at least last a significant time. While conventional designs and techniques offer low power, and therefore long lifetime, there is still a need to improve the low power capability and lifetimes.

SUMMARY

Systems and methods for including low cost and low power radio circuits are described herein.

According to one aspect, a SoC module comprises a battery; and a radio circuit, the radio circuit comprising: a DC-to-DC converter coupled with the battery and configured to convert a battery voltage to a first DC voltage level; at least one regulator coupled with the DC-to-DC converter and configured to covert the first DC voltage level to a second DC voltage level; at least one circuit block coupled with the at least one regulator such that the second DC voltage level is configured to provide power to the at least one circuit block; a real time clock configured to provide a clock signal to the at least one circuit block; and a management unit coupled with the at least one circuit block and configured to implement a state machine to control the at least one circuit block, wherein the state machine causes the management unit to cause the second DC voltage level to be removed from the at least one circuit during a first state comprising the state machine and, during a second state comprising the state machine, cause the second DC voltage level to be provided to the at least one circuit block, cause certain components within the circuit block to be reset, and provide a start signal to the circuit block enabling the circuit block to perform a function, and wherein the circuit block is configured to generate a signal indicating the function has been completed that is provided to the management unit, which causes the state machine to transition to a third state in which the second DC voltage is gain removed from the at least one circuit block.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIGS. 6-9 illustrate the characteristics, block activity, and time scale for 4 example power profiles (Pn) that can be implemented by the SoC management unit of FIG. 3A.

DETAILED DESCRIPTION

In the embodiments described herein, various components of various circuits are described. It will be understood that the embodiments are by way of example only and that the descriptions do not necessarily include all of the components necessary for a fully functional circuit. Rather, certain components are shown in order to illustrate the principals described herein.

Figure 1:
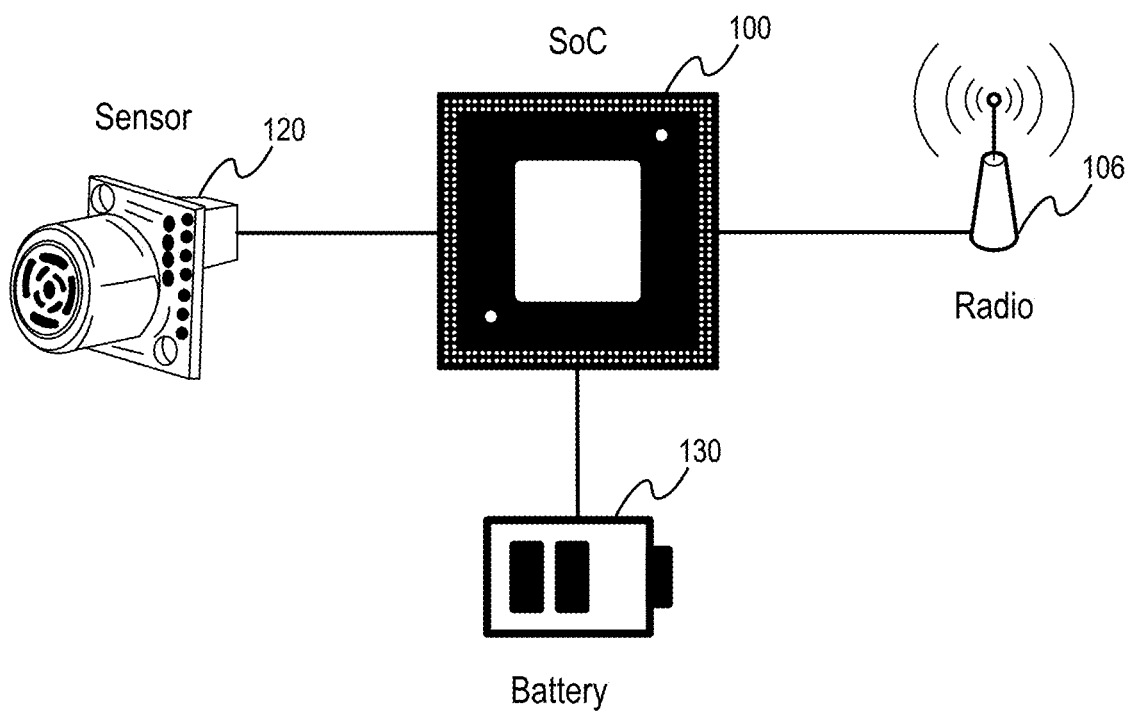
FIG. 1 is a diagram illustrating an example SoC that can include the circuits and components of FIG. 4 in accordance with one embodiment.
Figure 2:
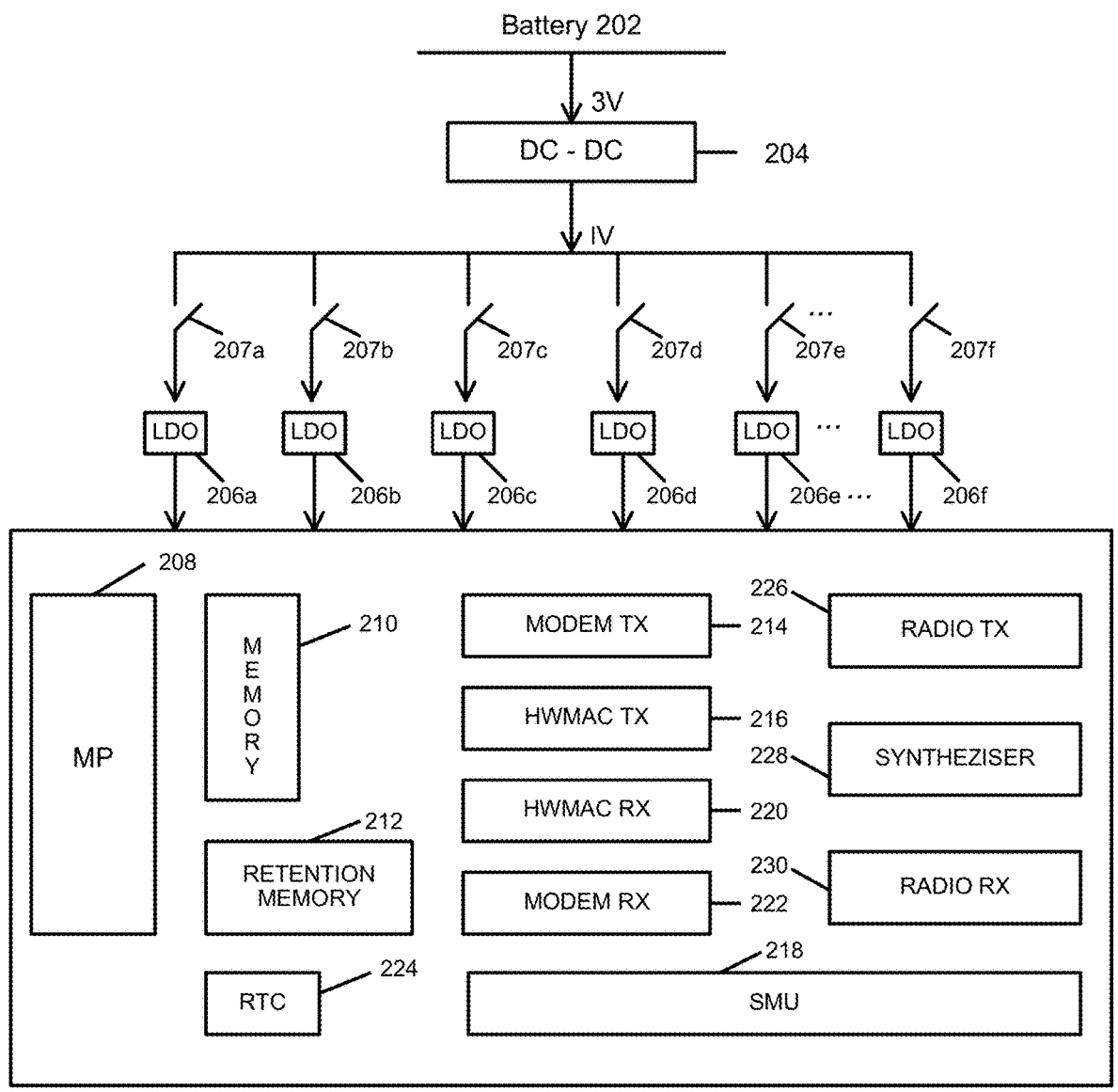
FIG. 2 is a diagram illustrating example circuit blocks included in the SoC of FIG. 1 in accordance with one embodiment.

FIG. 2 is a diagram illustrating an example SoC for a lower power wireless communication device or module. As can be seen, a battery 202, which can be included in the device or module or external, provides power to the circuits of SoC 100. Often, battery 202 will be designed to produce a DC voltage at around 3V; however, this voltage must be stepped down to significantly lower levels, e.g., 1 V and below, for low power operation. Moreover, often various circuits within SoC can require slightly different voltages for proper operation. Accordingly, SoC 100 will often include a DC-DC converter 204 configured to reduce the voltage produced by battery 202 to a lower level, such as 1 V. The DC-DC converter will then often be followed by one or more low-dropout regulators (LDO's) 206a-206e, which are configured to regulate the output voltage even when the supply voltage is very close to the output voltage. The advantages of a low dropout voltage regulator over other DC to DC regulators include the absence of switching noise, as no switching takes place, smaller device size, as neither large inductors nor transformers are needed, and greater design simplicity. An LDO usually consists of a reference, an amplifier, and a pass element. A significant disadvantage is that, unlike switching regulators, linear DC regulators must dissipate power across the regulation device in order to regulate the output voltage.

In certain implementations, DC-DC converter 204 can be excluded. Also, as noted there is a voltage drop across the LDO's 206. Thus, if for example the input voltage is 1 V, then the output voltage from LDO's 106 will be something like 900 mV. The output voltage from LDO's 206 can them be routed to the various circuits within SoC 100 in order to power those circuits.

As can be seen, these circuits include a microprocessor 208, memory 210, in certain embodiments retention memory 212, transmit modem 214, a hardware media access control (MAC) transmit block 216, a receive modem 222, hardware MAC receive block 220, and real-time clock (RTC) 224. Each of these circuits would generally be part of the digital circuits 102. SoC 100 can then further comprise transmit radio 226, receive radio 230 and synthesizer 228, which would typically be part of the radio front end 104. It will also be understood that SoC 100 can also comprise or can be organized into other blocks or circuits. Thus, the circuits illustrated in FIG. 2 are by way of illustration only and not necessarily intended to limit the scope of the embodiments and techniques described.

As can also be seen, SoC includes a SoC Management Unit (SMU) 218. SMU 218 is configured to control whether power from, e.g., LDO's 206 is presented to the various circuits and in this manner to turn the various circuits on and off at various points in the operation of SoC 100. SMU 218 can be the central power manager of the SoC 100. As explained below, SMU 218 can perform power gating to each block within SoC 100 and can be implemented as a hardware programmable state machine. Moreover, the state machine being implemented can be application dependent or specific.

Figure 5:
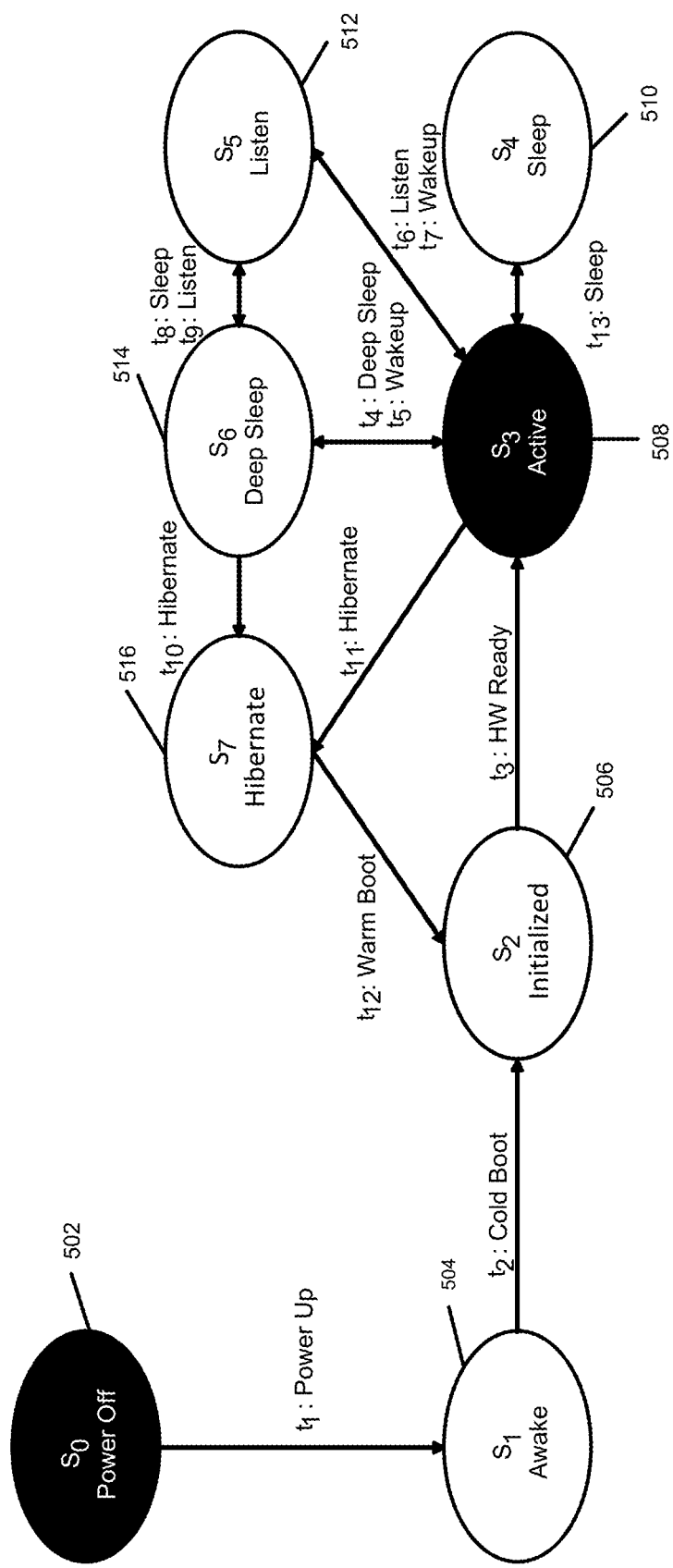
FIG. 5 is a diagram of an example state machine that can be implemented by the SoC management unit of FIG. 3.

One function of SMU 218 is to implement a state machine that defines the various operation states of SoC 100. An example state diagram defining such a state machine is presented in FIG. 5. The state diagram of FIG. 5 illustrates the states and the trigger events that cause a transition from one state to another. State are generally defined by the on/off/clock state of all hardware blocks or circuits. The triggers can be hardware or software triggers. As can be seen, the SoC 100 can start in power off (S0) and transition to awake (S1) on power up (t1). From the Awake state (S1), SoC 100 can transition to the initialized state (S2) upon a cold boot trigger (t2). From the initialized sate (S2), the SoC 100 can transition to the active state (S3) upon a hardware ready trigger (t3).

Once in the active state (S3), SoC 100 can transition into any one of 4 states depending on the trigger event: If a sleep trigger (t13) is received, then SoC 100 can transition into the sleep state (S4); a listen trigger (t6) will cause a transition into the listen state (S5); a deep sleep trigger (t4) will cause a transition into deep sleep state (S6); and a hibernate trigger (t11) will cause a transition into hibernate state (S7). Once in the listen state (S5) or the deep sleep state (S6) a wakeup trigger (t7) or (t5) respectively, will cause SoC 100 to transition back to the active state (S3). Once in the hibernate state (S7) a warm boot trigger (t12) will cause the SoC 100 to transition back to the initialized state (S2).

The state diagram of FIG. 5 illustrates various power events (En) that can be performed. A power event (En) is defined by a sequence of valid transitions between power states (Sn). Table 1 provides a list of the power events (En) and the associated states and transitions along with the triggers that cause the transitions.

TABLE 1

| | | |
|---|---|---|
| $E_1$: Cold Boot | | $S_0 \xrightarrow{t_1} S_1 \xrightarrow{t_2} S_2 \xrightarrow{t_3} S_3$ |
| $E_2$: Warm Boot | | $S_7 \xrightarrow{t_{12}} S_2 \xrightarrow{t_3} S_3$ |
| $E_3$: Active | | $S_0 \xrightarrow{t_1} S_1 \xrightarrow{t_2} S_2 \xrightarrow{t_3} S_3$ |
| $E_4$: Listen | | $S_3 \xrightarrow{t_6} S_5 \xrightarrow{t_7} S_{3tx}$ |
| $E_5$: Listen | | $S_3 \xrightarrow{t_6} S_5 \xrightarrow{t_7} S_{3rx}$ |
| $E_6$: Hibernate | | $S_3 \xrightarrow{t_{11}} S_7 \xrightarrow{t_{12}} S_2 \xrightarrow{t_3} S_3$ |
| $E_7$: Powersave | | $S_3 \xrightarrow{t_{13}} S_4 \xrightarrow{t_{13}} S_3$ |

The overall effective power (Wtotal) for SoC 100 is then the sum of the power for each state, which is the power consumption (Ws) of the state multiplied by the time (Ts): Wtotal=ΣWs*Ts. It will be understood that in each state, the various components or circuits of SoC 100 can be in various operational states, e.g., some may be on and active, some may be on but idle, some may be off or in a sleep mode. But in conventional designs, power is being delivered to each circuit in each state. Thus, even if it is just due to leakage, each circuit is consuming power during each state. The more active circuits there are for a state, the more power is being consumed in that state. In fact the power consumption for each block or circuit is a function of the power during the startup time, the transition time, the active time, and any leakage.

Accordingly, the overall effective power (Wtotal) can be reduced, by reducing the power consumption of the various components in each state, and by eliminating certain states where they are not necessary. Thus, as noted above SMU 218 can therefore be configured to implement custom power profiles (Pn) based on the needs of a given application that only implement certain power events (En). This reduces the number of states and therefore the amount of startup time, transition time, and active time for each block or circuit. Thus, a power profile (Pn) is defined by a sequence of power events (En) that are guided by use cases related to final products. Table 2 list an example set of power profiles:

TABLE 2

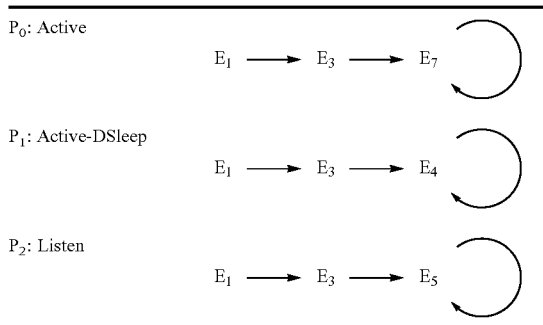

$P_0$: Active
$E_1 \longrightarrow E_3 \longrightarrow E_7$ $P_1$: Active-DSleep
$E_1 \longrightarrow E_3 \longrightarrow E_4$ $P_2$: Listen
$E_1 \longrightarrow E_3 \longrightarrow E_5$ Thus, for example, if a device need only wake up and transmit information from time to time for a certain application, then SMU 218 can be configured to implement a power profile (P0) that only performs power events E1, E3, and E7, i.e., cold boot, active, and power save. In this way, SMU 218 implements a configurable hardware state machine that can be configured based on the needs of a particular application.

FIG. 6-9 illustrate the characteristics, block activity, and time scale for 4 example power profiles (Pn): the Active-sleep profile, which can be the fastest wake up profile; the listen profile, which can be on air even based; the deep sleep profile, which can be a sensor event based profile; and a hibernate profile, which can be external trigger based and can have the lowest power consumption.

Moreover, SMU 218 can be configured to turn off various blocks during each state (Sn) if they are not needed. For example, if SoC 100 is in the listening state, then none of the transmit blocks need be turned on. In certain embodiments, a block can be turned off by controlling the switches 207 to the various related LDO's 206. In this way, leakage through the LDO's 206 is eliminated. Moreover, because power is completely removed from the block, there is not leakage through the block either. For complete power down, or deep sleep which is described in more detail below, the battery can be removed from DC-DC converter 204 via switch 205.

In certain embodiments, switches 207 can also be included and used to remove power from a certain block. The advantage of using switches 207 is that the settling time for powering on and off a block is reduced, thereby reducing the time to when the block can be effectively powered up for use. The tradeoff of course is that the corresponding LDO 206 remains on and consumes at least some power. But inclusion of the switches 207 allows for a tradeoff between faster power up and lower power consumption as may be required by the states being implemented.

Table 3 illustrates the turning off and on of various blocks for each state. The blocks in the chart do not match the blocks in FIG. 2, but serve to illustrate the point.

TABLE 3

| State | SMU | OSC44m | OSC32k | CPU | TX-HWMAC | MODEM-TX/RADIO | RX-HWMAC | MODEM-RX/RADIO | Retention Memory |
|---|---|---|---|---|---|---|---|---|---|
| Power Down | OFF | OFF | OFF | OFF | OFF | OFF | OFF | OFF | OFF |
| Reset | ON | ON | OFF | RST | RST | RST | RST | RST | RST |
| Active | ON | ON | OFF | ON | AUTO | AUTO | AUTO | AUTO | OFF |
| Sleep | ON | ON | OFF | ON | OFF | OFF | OFF | OFF | ON |
| Listen | ON | ON | OFF | ON | ON | OFF | ON | ON | OFF |
| Deep Sleep | ON | ON | ON | OFF | OFF | OFF | OFF | OFF | ON |
| Hibernate | ON | OFF | ON | OFF | OFF | OFF | OFF | OFF | ON |

TABLE 2-continued

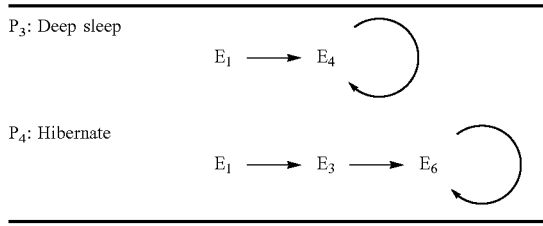

$P_3$: Deep sleep
$E_1 \longrightarrow E_4$ $P_4$: Hibernate
$E_1 \longrightarrow E_3 \longrightarrow E_6$ The Deep sleep state is worth noting here. The purpose of deep sleep is to put SoC 100 into a state in which the lowest possible power is being consumed. Thus, in certain embodiments, during deep sleep everything can be turned off except SMU 218, the clock (RTC 224) and retention memory 212. The retention memory can be used to store the content of registers for various blocks before those blocks, including regular memory 210 are turned off. A course voltage regulator (not shown) can be included to provide power to these components during deep sleep. Thus, during deep sleep the DC to DC converter 204 and LDO's 206 can all be turned off and therefore all of the blocks except those noted above.

Also, the SMU 218 can include wake up logic, such that the rest of the SMU, except the wake up logic, can also be shut down during deep sleep. A timer can be included, such that once the timer expires, the wake up logic can turn on the DC to DC converter 204, which will lead to the appropriate LDO's, depending on the following state, being turned on.

Figure 3A:
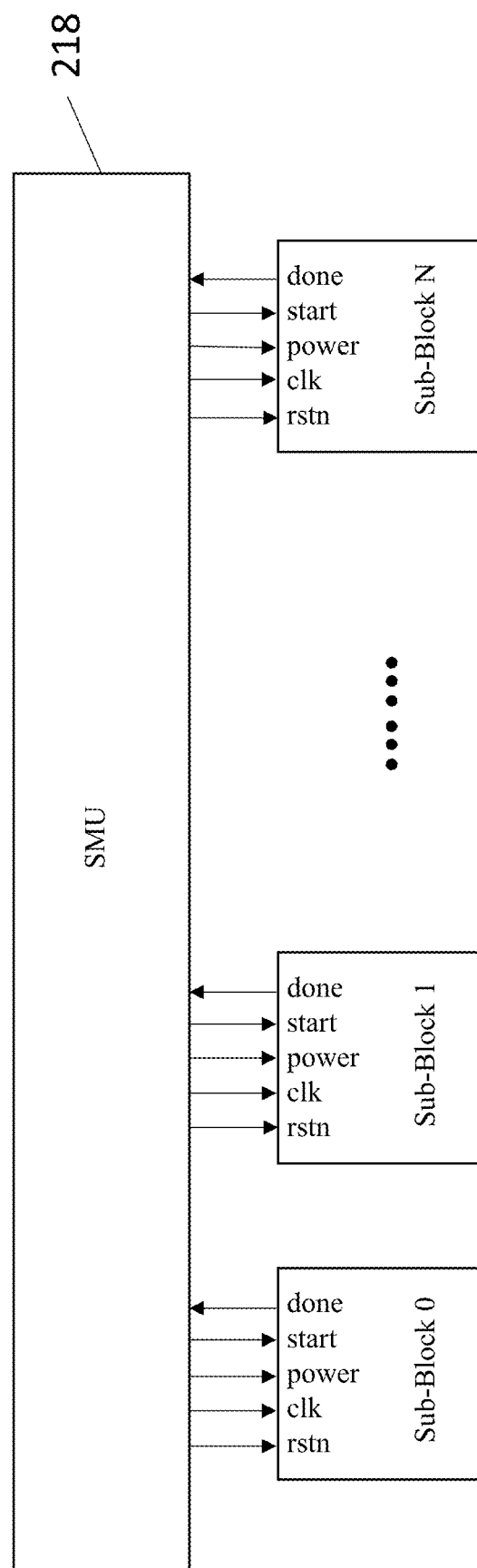
FIG. 3A is a diagram illustrating an example SoC management unit included in the circuit blocks of FIG. 2 in accordance with one embodiment.

Thus, as illustrated in FIG. 3A, SMU 218 can have a plurality of power control outputs (pwr) configured to control the switches 207 in order to power on and off various blocks. SMU 218 can also include a plurality of block start outputs (START) configured to activate a certain block, e.g., a certain delay time period after power for the block is activated. Each block can then generate a signal (DONE) indicating completion of their task that can be fed back to SMU 218, which can cause SMU 218 to then power down the block as appropriate.

Additionally, SMU 218 can control the clock for various blocks, i.e., the clock can be gated via the CLK signal. This can reduce leakage in the various blocks. SMU 218 can also have a synchronous or asynchronous reset (RST) signal that can be used to, e.g., reset various block resistors, etc., before powering up and/or activating the clocks for various blocks.

In this manner, SMU 218 can control/reduce the number of states as well as the amount of power being consumed per state in order to provide the lowest possible power consumption for a given application.

Figure 3B:
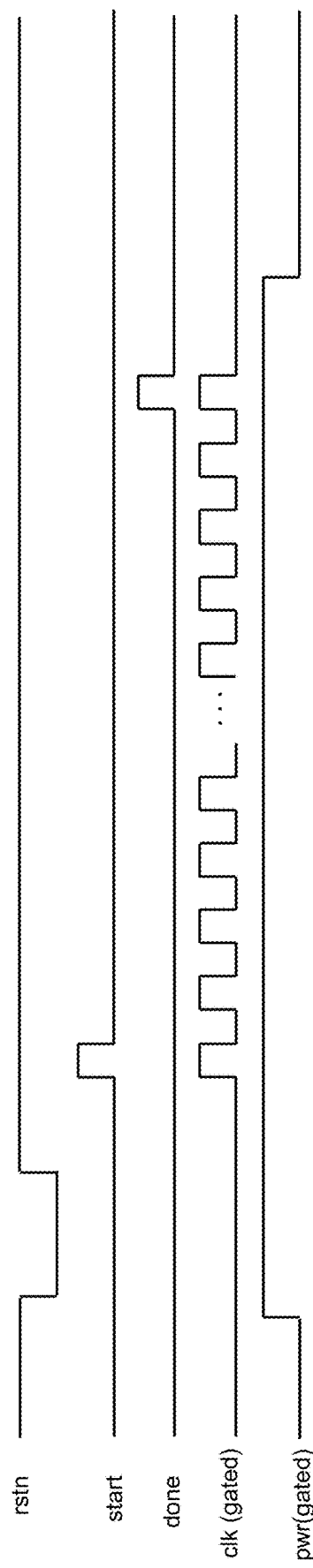
FIG. 3B is a diagram illustrating the waveforms for signals generated by the SoC management unit of FIG. 3A.
Figure 4:
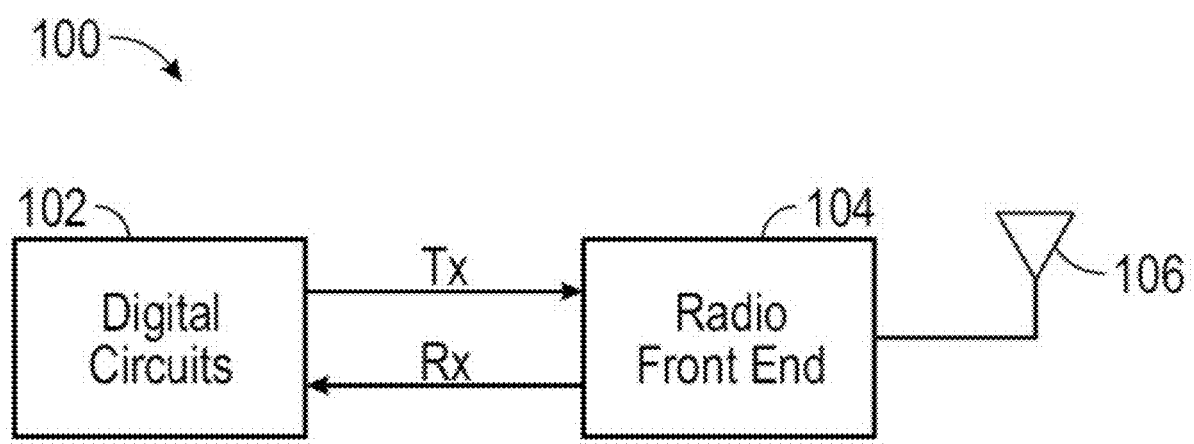
FIG. 4 is a diagram illustrating a wireless communication circuit.

Example wave forms and timing for these signals are illustrated in FIG. 3B.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. A method within a hardware programmable state machine comprising, a plurality of circuit blocks, and a management unit communicatively coupled with the plurality of circuit blocks and configured to implement a hardware programmable state machine defined by a dynamically created, application specific power profile having a plurality of application specific power events, each power event comprising a plurality of transitions between a plurality of power states, each power state defining a different operational state for the plurality of circuit blocks, the method comprising:

based on a specific application, automatically selecting from a plurality of power events only those power events needed to perform the functions required for the specific application, so as to ensure the lowest possible power consumption and longest possible battery life, the selected power events of the plurality of power events constituting the application specific power events and defining the application specific power profile;

generating programming instructions configured to cause the management unit circuit to implement the application specific power profile; and transmitting programming instructions to the hardware programmable state machine, wherein the plurality of power states comprises at least some of a power off state (S0), and awake state (S1), and initialized state (S2), an active state (S3), an active transmitting state (S3tx), an active receiving state (S3rx), a sleep state (S4), a listen state (S5), a deep sleep state (S6), and a hibernate state (S7), and wherein the plurality of application specific power events comprise a combination of a cold boot event (E1), a warm boot event (E2), an active event (E3), a listen event (E4), a second listen event (E5), a hibernate event (E6), and a power save event (E7);

wherein, based on the programming instructions, the management circuit causes a DC-to-DC converter to shift from supplying a first voltage to supplying a second voltage to at least one of the plurality of circuit blocks.

2. The method of claim 1, wherein the power events comprise the following power states and transitions:

E1 comprises an S0 to S1 transition, followed by an S1 to S2 transition, followed by an S2 to S3 transition;

E2 comprises an S7 to S2 transition, followed by an S2 to S3 transition;

E3 comprises an S0 to S1 transition, followed by an S1 to S2 transition, followed by an S2 to S3 transition;

E4 comprises an S3 to S5 transition, followed by an S5 to S3tx transition;

E5 comprises an S3 to S5 transition, followed by an S5 to S3rx transition;

E6 comprises an S3 to S7 transition, followed by an S7 to S2 transition, followed by an S2 to S3 transition; and E7 comprises an S3 to S4 transition, followed by an S4 to S3 transition.

3. The method of claim 1, wherein the application specific power profile is one of an active profile (P0), an active deep sleep profile (P1), a listen profile (P2), a deep sleep profile (P3), and a hibernate profile (P4).

4. The method of claim 3, wherein the power profiles comprise the following power events and transitions:

P0 comprises an E1 to E3 transition, followed by an E3 to E7 transition, followed by a repeating cycle through E7;

P1 comprises an E1 to E3 transition, followed by an E3 to E4 transition, followed by a repeating cycle through E4;

P2 comprises an E1 to E3 transition, followed by an E3 to E5 transition, followed by a repeating cycle through E5;

P3 comprises an E1 to E4, followed by a repeating cycle through E4; and

P4 comprises an E1 to E3 transition, followed by an E3 to E6 transition, followed by a repeating cycle through E6.

5. A hardware programmable state machine comprising:

a DC-to-DC converter coupled with a battery and configured to convert the battery voltage to a first DC voltage level;

at least one regulator coupled with the DC-to-DC converter and configured to convert the first DC voltage level to a second DC voltage level;

a plurality of circuit blocks, and a management unit communicatively coupled with the plurality of circuit blocks and configured to implement the hardware programmable state machine defined by a dynamically created, application specific power profile having a plurality of application specific power events, each power event comprising a plurality of transitions between a plurality of power states, each power state defining a different operational state for the plurality of circuit blocks, the hardware programmable state machine configured to:

receive programming instructions configured to cause the management unit circuit to implement the application specific power profile; and implement the power profile as instructed by implementing the corresponding plurality of application specific power events, wherein the corresponding plurality of application specific power events causes the management unit to:

cause the second DC voltage level to be provided to at least one of the plurality of circuit blocks during an operational state defined by the corresponding plurality of application specific power events, cause at least a portion of the at least one circuit block of the plurality of circuit blocks to be reset, provide a start signal to the at least one circuit block enabling the at least one circuit block to perform a function, receive from the at least one circuit block, prior to the transition from a current power state of the power states to a next power state of the power states, a signal indicating the function has been completed, and cause the second DC voltage to be removed from the at least one circuit block during the current power state.

6. The hardware programmable state machine of claim 5, wherein prior to the transition from the current power state to the next power state the management unit circuit is further configured to remove the clock signal from the at least one circuit block.

7. The hardware programmable state machine of claim 5, further comprising a switch coupled between the at least one regulator and the at least one circuit block, and wherein the management unit circuit is further configured to remove the second DC voltage from the at least one circuit block by controlling the switch.

8. The hardware programmable state machine of claim 5, further comprising a plurality of circuit blocks coupled with the at least one regulator, wherein the at least one regulator is configured to provide the second DC voltage to the plurality of circuit blocks, and wherein the management unit circuit is further configured to control each circuit block of the plurality of circuit blocks in the same manner as the at least one circuit block.

9. The hardware programmable state machine of claim 8, wherein the at least one regulator is a low drop out regulator.

10. The hardware programmable state machine of claim 8, wherein the plurality of circuit blocks comprises a microprocessor, a memory, a synthesizer, baseband transmit and receive blocks, and RF transmit and receive blocks.

11. The hardware programmable state machine of claim 8, wherein the plurality of circuit blocks comprises a retention memory configured to store register values and component values associated with the plurality of circuit blocks.

12. The hardware programmable state machine of claim 5, wherein the plurality of power states comprises at least some of a power off state (S0), and awake state (S1), and initialized state (S2), an active state (S3), an active transmitting state (S3$tx$), an active receiving state (S3$rx$), a sleep state (S4), a listen state (S5), a deep sleep state (S6), and a hibernate state (S7).

13. The hardware programmable state machine of claim 12, wherein during the deep sleep state, the second DC voltage is removed from all of the plurality of circuit blocks except the retention memory.

14. The hardware programmable state machine of claim 12, wherein the plurality of application specific power events comprise a combination of a cold boot event (E1), a warm boot event (E2), an active event (E3), a listen event (E4), a second listen event (E5), a hibernate event (E6), and a power save event (E7).

15. The hardware programmable state machine of claim 14, wherein the power events comprise the following power states and transitions:

E1 comprises an S0 to S1 transition, followed by an S1 to S2 transition, followed by an S2 to S3 transition;

E2 comprises an S7 to S2 transition, followed by an S2 to S3 transition;

E3 comprises an S0 to S1 transition, followed by an S1 to S2 transition, followed by an S2 to S3 transition;

E4 comprises an S3 to S5 transition, followed by an S5 to S3$tx$ transition;

E5 comprises an S3 to S5 transition, followed by an S5 to S3$rx$ transition;

E6 comprises an S3 to S7 transition, followed by an S7 to S2 transition, followed by an S2 to S3 transition; and E7 comprises an S3 to S4 transition, followed by an S4 to S3 transition.

16. The hardware programmable state machine of claim 14, wherein the application specific power profile is one of an active profile (P0), an active deep sleep profile (P1), a listen profile (P2), a deep sleep profile (P3), and a hibernate profile (P4).

17. The hardware programmable state machine of claim 16, wherein the power profiles comprise the following power events and transitions:

P0 comprises an E1 to E3 transition, followed by an E3 to E7 transition, followed by a repeating cycle through E7, P1 comprises an E1 to E3 transition, followed by an E3 to E4 transition, followed by a repeating cycle through E4, P2 comprises an E1 to E3 transition, followed by an E3 to E5 transition, followed by a repeating cycle through E5, P3 comprises an E1 to E4, followed by a repeating cycle through E4, and P4 comprises an E1 to E3 transition, followed by an E3 to E6 transition, followed by a repeating cycle through E6.

* * * * *